Oct. 18, 1938.  M. H. NEWELL  2,133,560
PROCESS AND APPARATUS FOR THE MANUFACTURE OF ZINC DUST
Original Filed Aug. 30, 1935
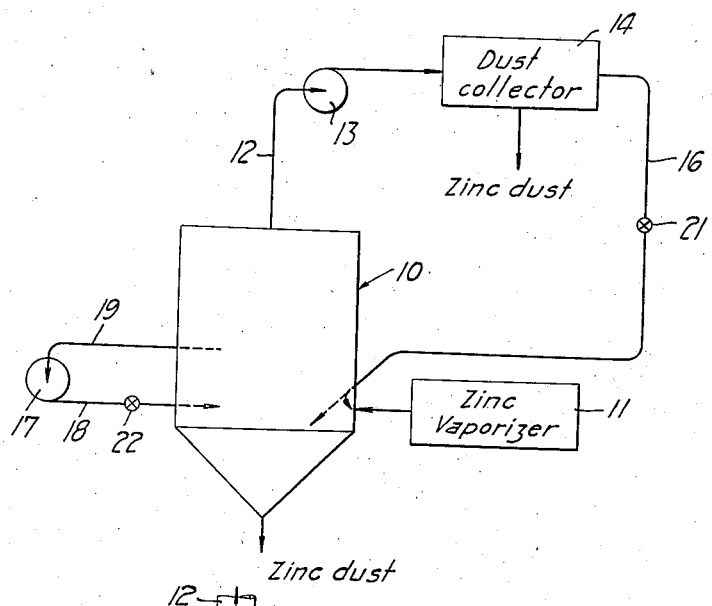
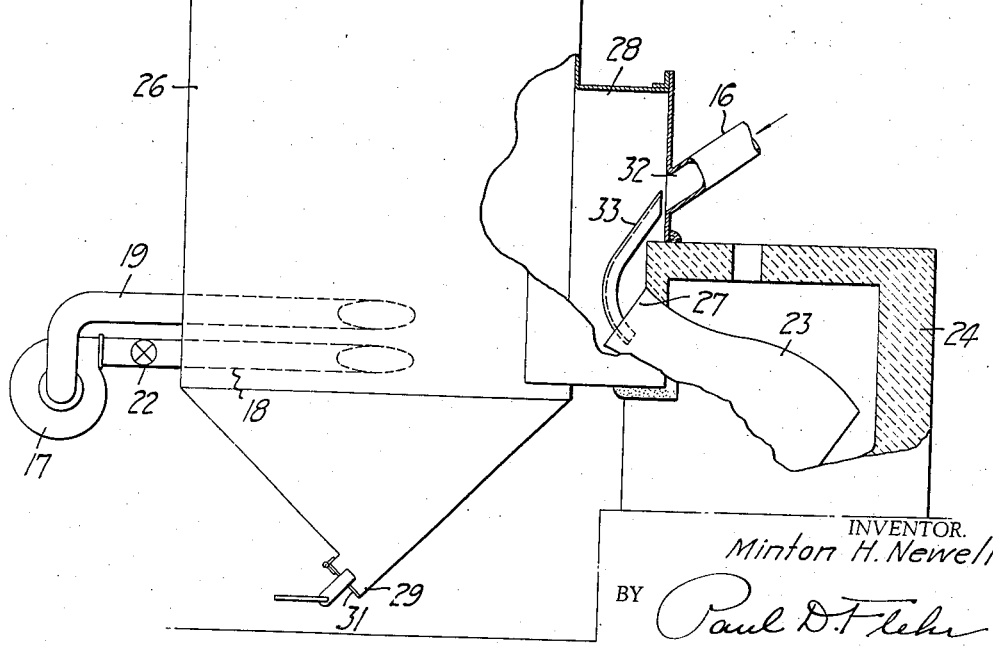
INVENTOR.
Minton H. Newell
BY
ATTORNEY.

Patented Oct. 18, 1938

2,133,560

UNITED STATES PATENT OFFICE 2,133,560

PROCESS AND APPARATUS FOR THE MANUFACTURE OF ZINC DUST

Minton H. Newell, Palo Alto, Calif., assignor to The Alloys Company, San Francisco, Calif., a corporation of California Application August 30, 1935, Serial No. 38,550
Renewed March 21, 1938

16 Claims. (Cl. 75—88)

This invention relates generally to processes and apparatus for the manufacture of finely divided zinc commonly known as zinc dust. Such material has many commercial uses, including for example its use to precipitate metals from cyanide solutions, as a reacting agent for the manufacture of hydrosulphites, as a paint pigment and as a reducing agent.

It is an object of the invention to provide a method and apparatus of the above character which will be flexible with respect to the control afforded, thereby making it possible to manufacture varying products, to afford best results for the different uses for which the products are intended.

Further objects of the invention will appear from the following description in which the preferred embodiment of the invention has been set forth in detail in conjunction with the accompanying drawing.

Referring to the drawing:

Fig. 1 is a diagrammatic view showing the general equipment and the various steps involved in the present invention.

Fig. 2 is a side elevational view, partly in cross section, showing suitable condensing equipment and associated parts, for use in conjunction with the invention.

In the past processes for the manufacture of zinc dust have utilized a condenser, into which zinc vapor from a retort is introduced. In utilizing such equipment it has been known that various factors influence the characteristics of products produced, but it has been difficult to control these factors, to produce predetermined results, whereby various products can be made which are best suited for certain specific purposes. The present process and apparatus differs from past practice in that a novel form of controlled recirculation is provided in conjunction with a condenser, together with controlled cooling of the condenser chamber.

Fig. 1 diagrammatically outlines the steps employed in the present process and indicates the equipment required. Thus a suitable condenser 10 is provided, which receives vapor from a suitable zinc vaporizor 11. A conduit line 12, together with blower 13, represents removal of gas together with some entrained zinc dust from the condenser, with delivery of the gas to a suitable dust collector 14. Conduit line 16 represents return of such removed gas back into the condenser chamber.

Representative means for effecting a controlled degree of cooling of the condenser chamber consists of a blower 17, together with the conduit lines 18 and 19. These conduit lines are shown having tangential communication with the condenser chamber, whereby when the blower 17 is operated to recirculate gases, a swirling or cyclonic movement of gas, dust and vapor, is set up within the condenser. Valve 21 represents suitable means for controlling re-introduction of gases removed by blower 13, while valve 22, represents means for controlling recirculation of gases by blower 17. For convenience, the two paths thus provided can be termed "primary" and "secondary" circulation paths, primary circulation being under control of valve 21, and the secondary circulation under control of valve 22.

Fig. 2 illustrates more clearly the manner in which gas handled by blower 13 is re-introduced back into the condenser 10, and also shows the relationship between such re-introduction of gases and introduction of zinc vapor. The vaporizer is shown consisting of a suitable retort 23 which is associated with a suitable furnace 24 for heating the same. The condenser includes an expansion chamber 26, which is of suitable dimensions, and which has its one side in communication with the mouth 27 of the retort 23 through a suitable means such as a hood 28. The lower end of chamber 26 is shown provided with an outlet 29 for the removal of collected zinc dust, and this outlet can be normally closed by a gate or flap 31. Conduit 16 communicates with the hood 28, through the discharge opening 32. It will be noted that this opening is arranged to discharge gas through a region immediately beyond the mouth 27 of the retort.

It has been found desirable to divert a part of the gas discharged from opening 32, so that a portion or stream thereof is deflected into the interior of the retort. For this purpose there is shown a deflector 33, which is in the form of a trough, and which has its upper end terminating adjacent the opening 32, and its lower end extending into the mouth 27 of the retort 23. This deflector causes a portion of the gas discharged towards its upper end to flow along its inner concave surface, and to be discharged into the interior of the retort through the mouth thereof.

Operation of the apparatus described above, and the carrying out of the present process can be outlined as follows: The retort 23 is charged with a suitable quantity of zinc and the furnace 24 is then sealed with respect to the condenser 10. As the temperature of the zinc approaches its vaporization point, blower 13 is put into operation, and valve 21 is opened to permit circulation of gas from the expansion chamber 26, through blower 13, dust collector 14, and thence back through conduit 16, into the expansion chamber. The initial zinc vapor evolved from the retort reacts with the oxygen contained in the circulating air to form zinc oxide. Gradually substantially all of the oxygen is consumed, leaving mostly nitrogen. When this period in the cycle of operation is reached, the zinc vapor commences to condense as zinc dust. A portion of the zinc dust now being formed within the expansion chamber 26 settles out of the gas by gravity and collects above the flap valve 31. Zinc dust drawn into the collector 14, is removed from the gas being circulated, whereby the gas re-introduced into the chamber 26 is substantially free of entrained zinc dust particles. Since parts of this re-circulation path are exterior of the expansion chamber, there is necessarily some loss of heat, with the result that gas re-introduced into the expansion chamber is at a temperature substantially lower than the temperature of the gas being removed. Gas delivered from the opening 32, blows across the mouth of the retort 23, and thus serves to dilute and cool the evolved vapors and to carry the same into the expansion chamber 26. Another portion or stream of this blast of gas is conveyed by deflector 33 into the interior of the retort, where it intermixes with the vapors being evolved from the same, for re-discharge through the mouth of the retort counter-currently with the incoming gas. Thus, dilution and cooling of the vapors occurs progressively, beginning within the retort 23, proceeding to a region adjacent the mouth of the retort, and ending within the expansion chamber 26. Progressive dilution and cooling is necessarily accompanied by progressive condensing of the zinc vapors, and at the same time the gas flow causes substantially all of the zinc dust to find its way into or to be condensed in the expansion chamber 26, without formation of undue accumulations in hood 16 or about the mouth of the retort.

The physical character of the zinc dust formed can be modified by varying the amount of gas recirculated by blower 13, as for example by manually varying the setting of valve 21. Further modifications in the characteristics of the product formed can be had by controlled recirculation through blower 17. As previously explained operation of blower 17 causes swirling or cyclonic movement of gas and material within chamber 26, and this swirling movement is at an angle to movements within this chamber caused by operation of blower 13. The net result is that hot gas and vapor are caused to progress towards the side walls of chamber 26, where heat from the same is rapidly dissipated through the metal chamber walls. Thus by intelligent control of one or both of the circulation paths, products differing widely in physical characteristics can be manufactured, whereby products can be supplied to the trade which are best suited for specific purposes.

In the above description the means provided for effecting a cyclonic movement within the expansion chamber 26, utilizes a circulation path which is more or less independent of the circulating path through blower 13. It is possible however to provide controlled cyclonic movement without the use of a separate circulation path, as for example by having conduit 16 discharge into the chamber 26 tangentially. In such event control of the one circulation path suffices to effect substantially complete control of the characteristics of the product produced, since it controls both progressive cooling of vapor being evolved from the zinc and cooling by dissipation of heat through the walls of the expansion chamber 26.

I claim:

1. In a process for the manufacture of zinc dust, characterized by the use of an expansion chamber into one side of which zinc vapor is introduced from the mouth of a retort, the steps of continuously diverting gas together with entrained zinc dust from said chamber, separating out entrained zinc dust from the gas so diverted, and then blowing diverted gas back into the chamber in a region adjacent the mouth of the retort.

2. In a process for the manufacture of zinc dust, characterized by the use of an expansion chamber into one side of which zinc vapor is introduced from the mouth of a retort, the steps of continuously diverting gas together with entrained zinc dust from said chamber, separating out entrained zinc dust from the gas so diverted, and then blowing diverted gas back into the chamber at a controlled rate in a region adjacent the mouth of the retort and with a substantial velocity component in a general direction towards the interior of the chamber.

3. In a process for the manufacture of zinc dust, characterized by the use of an expansion chamber in which zinc vapor is discharged from the mouth of a retort, the steps of conveying a stream of gas into the retort through the mouth of the same countercurrently with the flow of vapors discharging from the retort.

4. In a process for the manufacture of zinc dust, characterized by the use of an expansion chamber into one side of which zinc vapor is discharged from the mouth of a retort, the steps of conveying a controlled stream of gas into the retort through the mouth of the same countercurrently with the flow of vapors discharging from the retort, and utilizing another controlled stream of gas for further diluting and cooling vapors discharged from the mouth of the retort.

5. In a process for the manufacture of zinc dust, characterized by the use of an expansion chamber into one side of which zinc vapor is introduced from the mouth of a retort, the steps of continually diverting gas from said chamber, re-introducing said diverted gas back into said chamber at a controlled rate, and conveying a part of the reintroduced gas into the mouth of the retort.

6. In a process for the manufacture of zinc dust, characterized by the use of an expansion chamber into one side of which zinc vapor is delivered from the mouth of a vaporizing retort, the steps of continuously diverting gas from said chamber together with entrained zinc dust, removing entrained zinc dust from said diverted gas, continuously blowing a portion of said diverted gas back into said chamber in a region adjacent the mouth of the retort and at a controlled rate, said reintroduced diverted gas having a substantial velocity component toward the interior of the chamber, and conveying another portion of the diverted gas into the mouth of the retort.

7. In a process for the manufacture of zinc dust, characterized by the use of an expansion chamber into one side of which zinc vapor is delivered from the mouth of a vaporizing retort, the steps of continuously diverting gas from said chamber together with entrained zinc dust, removing entrained zinc dust from said diverted gas, continuously blowing a portion of said diverted gas back into said chamber at a controlled rate in a region adjacent the mouth of the retort, said reintroduced diverted gas having a substantial velocity component toward the interior of the chamber, discharging another portion of the diverted gas into the mouth of the retort, and causing gas within said chamber to swirl about a central axis whereby dissipation of heat from the chamber is augmented.

8. In a process for the manufacture of zinc dust, characterized by the use of an expansion chamber into which zinc vapor is introduced from the mouth of a retort, the steps of continuously diverting gas together with entrained zinc dust from said chamber, separating out entrained zinc dust from the gas so diverted, continuously reintroducing the diverted gas back into the chamber, and controlling dissipation of heat from the vapor within the chamber.

9. In apparatus for the manufacture of zinc dust or like metallic material, an expansion chamber, a vaporizing retort adapted to deliver zinc vapor to the expansion chamber, means forming a circulatory path for continuously diverting gas from said chamber and for continuously reintroducing the same back into the chamber at a controlled rate, said means including a separator serving to remove entrained zinc dust from the diverted gas, and means serving to cause gas to swirl about the interior of the chamber.

10. In apparatus for the manufacture of zinc dust or like metallic material, an expansion chamber, a vaporizing retort having an open mouth communicating with one side of the interior of the chamber, means forming a circulatory path for continuously diverting gas from the upper portion of said chamber and for continuously reintroducing the same back into the chamber, said means comprising a blower, a separator serving to remove entrained zinc dust from the diverted gas, and a conduit arranged to redeliver the diverted gas back into said chamber in a region adjacent the mouth of the retort, and an auxiliary circulating path serving to cause swirling of gas within the chamber about the vertical axis of the same.

11. In apparatus for the manufacture of zinc dust or like metallic material, an expansion chamber, a vaporizing retort having an open mouth communicating with one side of the interior of said chamber for delivery of zinc vapor thereto, means forming a circulatory path for continuously diverting gas from said chamber and for continuously reintroducing the same back into said chamber, said means including a blower and a conduit arranged to deliver the diverted gas back into said chamber in a region adjacent the mouth of the retort, and means serving to convey a portion of the reintroduced gas into the interior of the retort through the mouth thereof.

12. In a process for the manufacture of zinc dust, characterized by the use of an expansion chamber into one side of which zinc vapor is discharged from the mouth of a retort, the steps of conveying a controlled stream of gas into the retort through the mouth of the same countercurrently with the flow of vapors discharging from the retort, confining the cross sectional area of said stream of gas as conveyed into the mouth of the retort to an area less than the area of the mouth of the retort, and utilizing another controlled stream of gas for further diluting and cooling vapors discharged from the mouth of the retort.

13. In apparatus for the manufacture of zinc dust or like metallic material, an expansion chamber, a vaporizing retort having an open mouth communicating with one side of the interior of the chamber, means forming a circulatory path for continuously diverting gas from the upper portion of said chamber and for continuously reintroducing the same back into the chamber in a region adjacent the mouth of the retort, said region being also intermediate the upper and lower ends of the chamber, and means serving to cause cyclonic movement of gas within the chamber about the vertical axis of the same.

14. In a process for the manufacture of zinc dust or like metallic material, characterized by the use of an expansion chamber into one side of which zinc vapor is introduced from the mouth of a retort, the steps of continuously diverting a stream of gas from the chamber, continuously reintroducing a stream of the diverted gas back into the chamber in the region of the mouth of the retort, and causing a cyclonic movement of gas in said chamber about the axis of the same.

15. In a process for the manufacture of zinc dust or like metallic material, characterized by the use of an expansion chamber into one side of which zinc vapor is introduced from the mouth of a retort, the chamber having a generally upright axis, the steps of continuously diverting gas from the chamber, causing diverted gas to be reintroduced back into the chamber in the region of the mouth of the retort, and causing a cyclonic movement of gas in the chamber about the upright axis of the same.

16. In a process for the manufacture of zinc dust or like metallic material, characterized by the use of an expansion chamber into one side of which zinc vapor is introduced from the mouth of a retort, the steps of continuously diverting a stream of gas from the chamber, removing entrained zinc dust from said diverted gas, continuously re-introducing a stream of the diverted gas, after removal of zinc dust from the same, back into the chamber in the region of the mouth of the retort, and causing a cyclonic movement of gas in said chamber about the axis of the same.

MINTON H. NEWELL.